United States Patent
Komori (10) Patent No.: US 11,209,452 B2
(45) Date of Patent: Dec. 28, 2021

(54) SAMPLE TRANSFER DEVICE

(71) Applicant: Shimadzu Corporation, Kyoto (JP)

(72) Inventor: Yuki Komori, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 322 days.

(21) Appl. No.: 16/427,801

(22) Filed: May 31, 2019

(65) Prior Publication Data

US 2020/0041533 A1 Feb. 6, 2020

(30) Foreign Application Priority Data

Aug. 6, 2018 (JP) .............................. JP2018-148014

(51) Int. Cl.
*G01N 35/10* (2006.01)

(52) U.S. Cl.
CPC ..... *G01N 35/1065* (2013.01); *G01N 35/1011* (2013.01)

(58) Field of Classification Search
CPC .......... G01N 35/1065; G01N 35/1011; G01N 35/0099; G01N 2035/0406; B65G 47/911; B25J 15/0616; B25B 11/005
See application file for complete search history.

(56) References Cited

U.S. PATENT DOCUMENTS

| | | | | |
|---|---|---|---|---|
| 4,767,437 A | * | 8/1988 | Lampman | C03B 35/16 65/104 |
| 6,099,056 A | * | 8/2000 | Siniaguine | H01L 21/6838 294/188 |
| 6,168,697 B1 | * | 1/2001 | Siniaguine | H01L 21/6838 118/728 |
| 6,427,991 B1 | * | 8/2002 | Kao | B23Q 1/38 269/21 |
| 6,467,297 B1 | * | 10/2002 | Bollinger | H01L 21/223 156/345.1 |
| 7,510,226 B2 | * | 3/2009 | Akiyama | B65G 49/061 294/64.3 |
| 2003/0044577 A1 | * | 3/2003 | Dhar | G11B 7/253 428/137 |
| 2017/0062263 A1 | * | 3/2017 | Kesil | B25J 15/0616 |
| 2017/0158369 A1 | * | 6/2017 | Dopfer | B65B 69/0008 |

FOREIGN PATENT DOCUMENTS

JP 2016-203309 A 12/2016

* cited by examiner

*Primary Examiner* — Jill A Warden
*Assistant Examiner* — John McGuirk
(74) *Attorney, Agent, or Firm* — Maier & Maier, PLLC (57) ABSTRACT

A sample transfer device includes a sample container holder including at least one jet that ejects air, and the sample container holder holds an upper surface of a sample container in a non-contact state by a negative pressure generated due to horizontally outward flow of the air ejected from the jet.

11 Claims, 11 Drawing Sheets

SAMPLE TRANSFER DEVICE

CROSS-REFERENCE TO RELATED APPLICATIONS

This application claims the benefit of priority to Japanese Patent Application No. 2018-148014 filed on Aug. 6, 2018. The entire contents of this application are hereby incorporated herein by reference.

BACKGROUND OF THE INVENTION

Field of the Invention

The present invention relates to a sample transfer device.

Description of the Background Art

A sample transfer device that transfers a sample container is known in general. Such a sample transfer device is disclosed in Japanese Patent Laid-Open No. 2016-203309, for example.

In a sample transfer device disclosed in Japanese Patent Laid-Open No. 2016-203309, a sample container is transferred by a horizontally and vertically movable manipulator. The manipulator disclosed in Japanese Patent Laid-Open No. 2016-203309 includes a plurality of fingers, and transfers the sample container in a state in which the sample container is gripped by the plurality of fingers.

Specifically, the fingers are moved such that claws provided at the tips of the plurality of fingers approach or move away from the central axis of the manipulator. Therefore, the fingers are moved such that the claws can grip the sample container.

In a gripper of the sample transfer device disclosed in Japanese Patent Laid-Open No. 2016-203309, when a plurality of sample containers are placed, the claws conceivably hit against a sample container other than a target sample container. Therefore, it is disadvantageously necessary to provide a sufficient space between the sample containers in order for the claws not to hit against the sample container.

Therefore, although not disclosed in Japanese Patent Laid-Open No. 2016-203309, a magnet system in which a magnet is attached to the tip of the manipulator instead of the gripper is conceivable. In the magnet system, the sample container can be gripped (attracted) from the upper side of the sample container unlike the claws, and thus it is conceivably unnecessary to provide a large space between the sample containers. However, a lid of the sample container is often made of a material that does not react to a magnet, and thus it may be necessary to replace the lid by a lid made of metal that reacts to the magnet. Therefore, it conceivably takes time to replace the lid. Furthermore, the magnet is in direct contact with the metal lid, and thus the sample adheres to the metal lid such that contamination in which the samples are mixed with each other may occur.

SUMMARY OF THE INVENTION

The present invention has been proposed in order to solve the aforementioned problems, and an object of the present invention is to provide a sample transfer device in which it is not necessary to provide a large gap between sample containers, it is not necessary to replace a lid of a sample container, and it is possible to significantly reduce or prevent the occurrence of contamination.

In order to attain the aforementioned object, a sample transfer device according to an aspect of the present invention includes a sample container holder including at least one jet that ejects air, a movement mechanism that moves the sample container holder, and an air supply unit that supplies the air to the sample container holder. The jet is provided in a portion that holds a sample container in the sample container holder, and directs the air supplied from the air supply unit horizontally outward, and the sample container holder holds an upper surface of the sample container in a non-contact state by a negative pressure generated due to horizontally outward flow of the air ejected from the jet.

As described above, the sample transfer device according to this aspect of the present invention includes the sample container holder including at least one jet that ejects air, and the sample container holder holds the upper surface of the sample container in the non-contact state by the negative pressure generated due to the horizontally outward flow of the air ejected from the jet. Accordingly, the sample container holder can hold the sample container in the non-contact state by the negative pressure generated due to the flow of the air ejected from the jet. Consequently, it is not necessary to provide a gripper (claws) that grips the sample container, and thus it is not necessary to provide a large gap between the sample containers. In addition, the upper surface of the sample container is held in the non-contact state such that a special lid made of metal, for example, is not necessary. Therefore, it is not necessary to replace a lid of the sample container. Furthermore, the sample container can be held in the non-contact state, and thus the occurrence of contamination can be significantly reduced or prevented. In addition, the sample container, the contact of which is to be avoided because a drug or a high-temperature sample is contained therein, can be safely transferred.

In the aforementioned sample transfer device according to this aspect, the sample container holder preferably includes a position restrictor that restricts horizontal movement of the sample container held by the sample container holder. According to this structure, the sample container holder can significantly reduce or prevent the horizontal movement of the sample container while holding the sample container in the non-contact state. Consequently, the sample container can be held without displacement, and thus the sample container holder can accurately transfer the sample container to a target location even in the non-contact state with the sample container.

In such a case, the sample container holder preferably includes a recess, and the recess preferably includes a bottom face portion that holds the sample container in the non-contact state and an inner side face portion that serves as the position restrictor. According to this structure, when the sample container held by the bottom face portion horizontally moves, the sample container comes into contact with the inner side face portion of the recess such that further movement of the sample container is prevented. Consequently, large horizontal movement of the sample container can be reliably significantly reduced or prevented, and thus the sample container holder can reliably transfer the sample container to a target location even in the non-contact state with the sample container.

The aforementioned sample transfer device according to this aspect preferably further includes a sample suction and discharge unit that suctions a sample from the sample container and discharges the sample at a predetermined position, and the movement mechanism preferably integrally moves the sample container holder and the sample suction and discharge unit in a horizontal plane. According to this structure, the sample container holder and the sample suction and discharge unit integrally move such that it is not necessary to individually provide a drive for each of the sample container holder and the sample suction and discharge unit. Consequently, the structure of the sample transfer device can be simplified, and an increase in the size of the sample transfer device can be significantly reduced or prevented while it is possible to perform suction from the sample container and discharge.

In such a case, the sample suction and discharge unit preferably suctions the sample to be analyzed by a chromatographic device and discharges the sample to a predetermined position of the chromatographic device. According to this structure, in one sample transfer device, the operation from transfer of the sample container to suction of the sample and discharge of the sample to the predetermined position of the chromatographic device can be continuously performed. Thus, the sample can be suctioned from the sample container transferred in the non-contact state and can be discharged to the chromatographic device. Consequently, the occurrence of contamination can be significantly reduced or prevented, and thus accurate chromatographic results can be obtained.

In the aforementioned sample transfer device that integrally moves the sample container holder and the sample suction and discharge unit, the sample container holder and the sample suction and discharge unit are preferably provided coaxially, and the sample container holder is preferably provided at a vertically downward tip of the sample suction and discharge unit. According to this structure, immediately after the sample container is transferred by the sample container holder in one sample transfer device, the sample suction and discharge unit can suction the sample.

In such a case, the sample container holder preferably includes, in a center of a portion that holds the sample container, a through-hole through which the sample suction and discharge unit is moved relative to the sample container holder vertically downward, and the jet preferably includes a plurality of jets that surround the through-hole. According to this structure, the jets are provided around the through-hole such that the pressure balance of the air ejected from the jets can be kept uniform. Furthermore, the through-hole is provided separately from the jets such that the sample suction and discharge unit can be moved vertically downward immediately after the sample container is transferred, and can easily suction the sample.

In the aforementioned sample transfer device according to this aspect, the jet preferably includes a plurality of jets provided at equal intervals in a portion that holds the upper surface of the sample container in the sample container holder. According to this structure, air is ejected at a constant interval, and thus the occurrence of unevenness in the air flow due to concentration of the jets in one area can be significantly reduced or prevented. Consequently, uniform air flow is obtained at all places in the portion that holds the sample container in the sample container holder. Consequently, the sample container holder can stably hold the sample container.

In the aforementioned sample transfer device according to this aspect, the jet preferably includes a plurality of jets provided point-symmetrically with respect to a center of the portion that holds the sample container in the sample container holder, and the air ejected from the plurality of jets preferably collides with each other to flow horizontally outward. According to this structure, the ejected air collides with each other such that the sample container holder can hold the sample container without rotating the sample container. Therefore, the sample container can be transferred without changing its orientation.

In the aforementioned sample transfer device according to this aspect, the jet preferably includes a plurality of jets provided point-symmetrically with respect to a center of the portion that holds the sample container in the sample container holder, and the air ejected from the plurality of jets preferably forms a rotating air flow. According to this structure, the sample container can be rotated by the rotating air flow, and thus a label or the like attached to the sample container can be read by a reader fixedly installed.

In such a case, the sample transfer device preferably further includes a reader that reads an identification information label attached to a side surface of the sample container, and the sample container holder preferably holds the sample container while rotating the sample container at a reading position so as to enable the reader to read the identification information label attached to the side surface of the sample container. According to this structure, it is not necessary to rotate the reader in order to enable the reader to read the identification information label attached to the sample container. Furthermore, the sample container is rotated by the air flow such that it is not necessary to provide a drive source that rotates the sample container. Consequently, the structure of the sample transfer device can be simplified.

In the aforementioned sample transfer device according to this aspect, the sample container holder preferably includes a first jet group including a plurality of jets that eject the air such that the air collides with each other to flow horizontally outward, and a second jet group including a plurality of jets that eject the air such that the air flows horizontally outward while forming a rotating air flow, and the sample container holder preferably switches a supply destination of the air from the air supply unit to the first jet group or the second jet group. According to this structure, the supply destination of the air from the air supply unit is switched such that it is possible to switch whether the sample container is rotated and held or is held without being rotated. Consequently, after the sample container is transferred, the identification information label can be read by rotating the sample container.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a sample transfer device 100 according to a first embodiment of the present invention is now described with reference to FIGS. 1 to 7.

Figure 1:
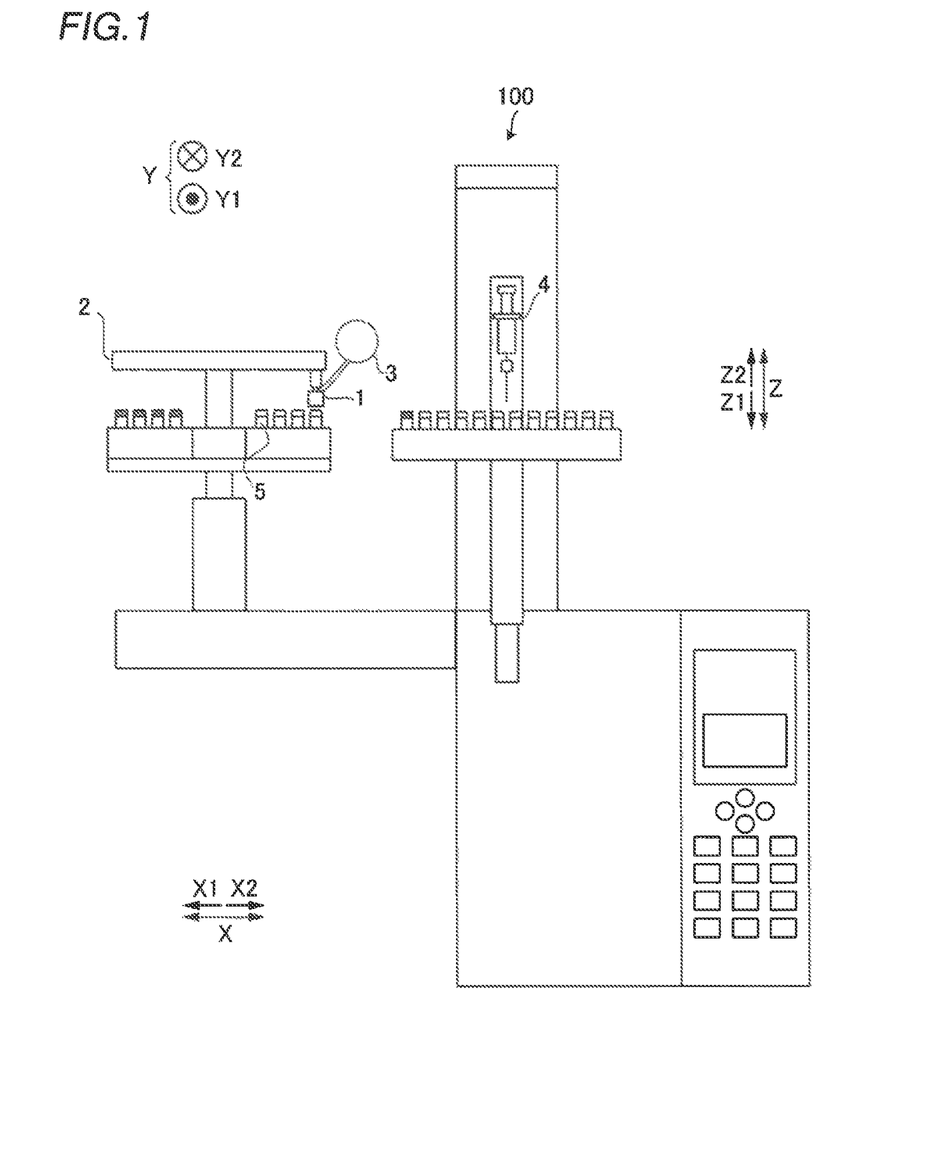
FIG. 1 is a schematic view showing the overall structure of a sample transfer device according to a first embodiment.

As shown in FIG. 1, the sample transfer device 100 includes a sample container holder 1, a movement mechanism 2, an air supply unit 3, and a sample suction and discharge unit 4.

Figure 2:
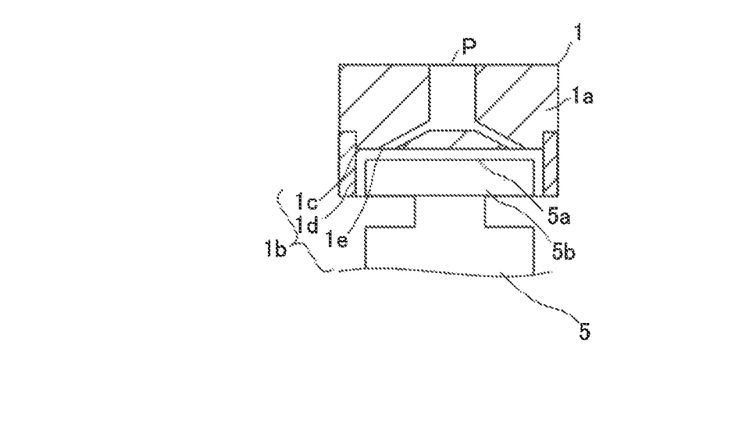
FIG. 2 is a sectional view of a sample container holder according to the first embodiment.

As shown in FIG. 2, the sample container holder 1 includes a main body 1a and a recess 1b. The recess 1b includes a bottom face portion 1c and an inner side face portion 1d. The bottom face portion 1c includes at least one jet 1e that ejects air.

In the main body 1a of the sample container holder 1, a flow path P to which air is supplied from the air supply unit 3 described below is provided. The flow path P is connected to a plurality of jets 1e, and air is supplied from the flow path P to the jets 1e and is ejected. The flow path P is provided obliquely, and air is ejected obliquely from the jets 1e.

The sample container holder 1 holds the upper surface 5a of a sample container 5 in a non-contact state based on Bernoulli's theorem that the pressure decreases and the negative pressure is generated as the flow velocity of air increases. Air is ejected between the bottom face portion 1c and the upper surface 5a of the sample container 5 from the jets 1e. Consequently, a horizontally outward flow (air flow) is generated. The air flow generates a negative pressure, and the sample container 5 is pulled up toward the sample container holder 1. On the other hand, gravity acts on the sample container 5. The sample container 5 is held by the sample container holder 1 in a non-contact state at a position at which a force for pulling up the sample container 5 toward the sample container holder 1 and a force for pressing down the sample container 5 due to gravity are well balanced.

Figure 3:
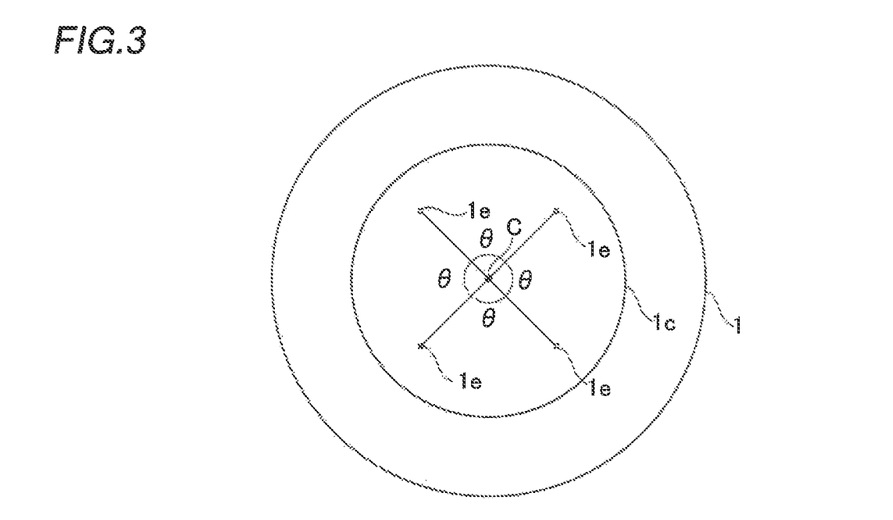
FIG. 3 is a bottom view of the sample container holder according to the first embodiment.

As shown in FIG. 3, one or more jets 1e are provided on the bottom face portion 1c. The bottom face portion 1c is an example of a "portion that holds the sample container" recited in the claims. The jets 1e are provided at equal intervals so as to be at a constant angle θ from the center C of the bottom face portion 1c. The jets 1e are provided obliquely such that air is ejected horizontally outward.

The inner side face portion 1d is an example of a "position restrictor" recited in the claims. The inner side face portion 1d is provided at a constant distance from the side surface of a lid 5b of the sample container 5. The sample container holder 1 holds the sample container 5 in a non-contact state with the upper surface 5a of the sample container 5, and thus when a force is applied to the side face portion of the sample container 5, the sample container 5 may horizontally move. However, the sample container 5 horizontally moves and the side surface of the lid 5b of the sample container 5 comes into contact with the inner side face portion 1d such that further horizontal movement of the sample container 5 can be significantly reduced or prevented. Even when the side surface of the lid 5b of the sample container 5 comes into contact with the inner side face portion 1d, the sample container 5 does not fall but is held due to the negative pressure generated by the air flow.

Figure 4:
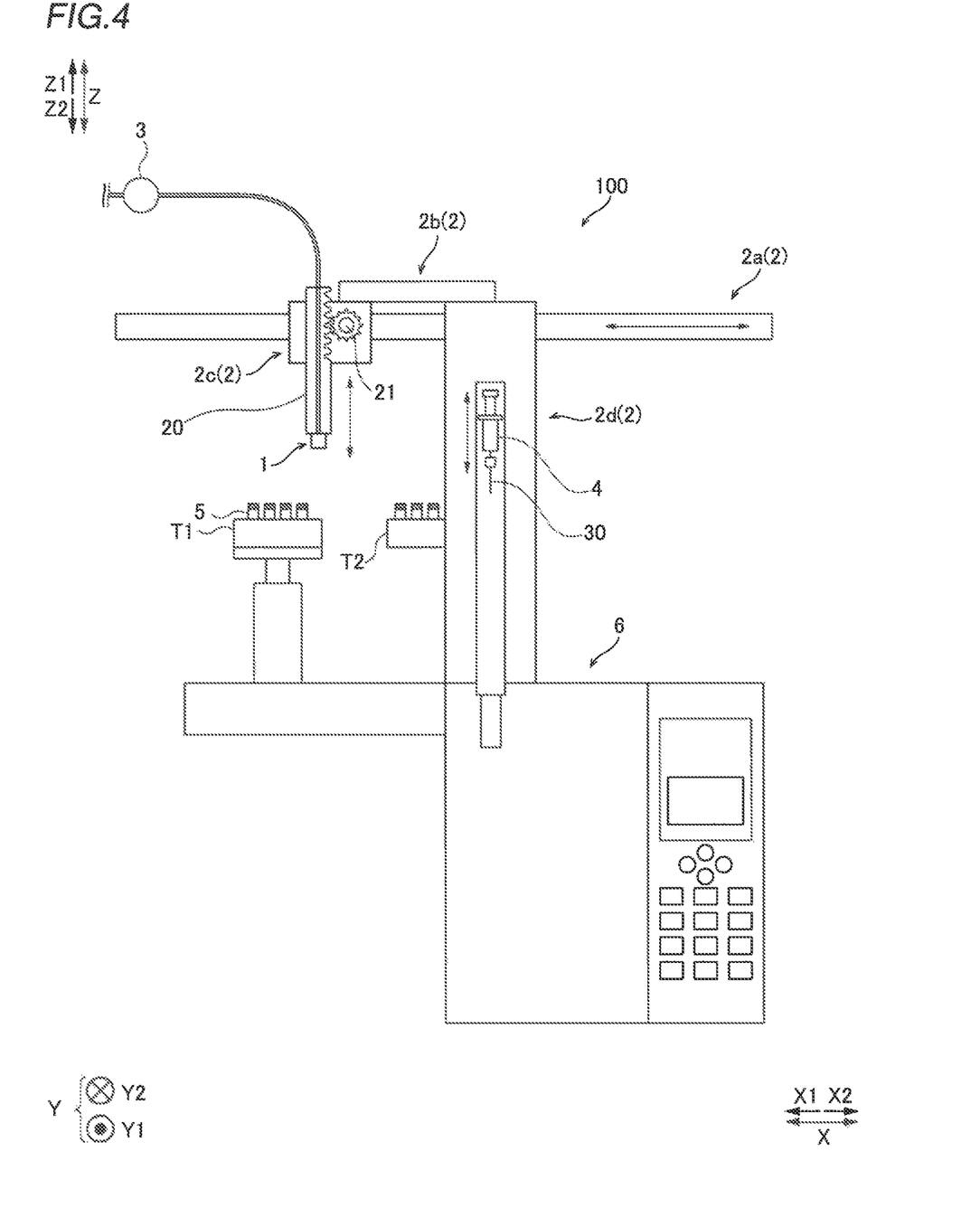
FIG. 4 is a schematic view showing the structure of a movement mechanism according to the first embodiment.

As shown in FIG. 4, the sample transfer device 100 includes a tray T1 on which the sample container 5 is placed. The tray T1 includes a plurality of holding holes, and the sample container 5 is inserted into each of the holding holes.

The sample container 5 held by the sample container holder 1 is transferred to a turret T2 of a sample suction and discharge unit 4. The turret T2 includes many holding holes. The holding holes provided in the turret T2 are tapered vertically downward. Therefore, even when the sample container 5 is held by the sample container holder 1 and is horizontally moved (displaced) during movement, the sample container 5 is guided by the side surface of a holding hole provided in the turret T2 such that the sample container 5 can be placed in a target holding hole provided in the turret T2.

Figure 5:
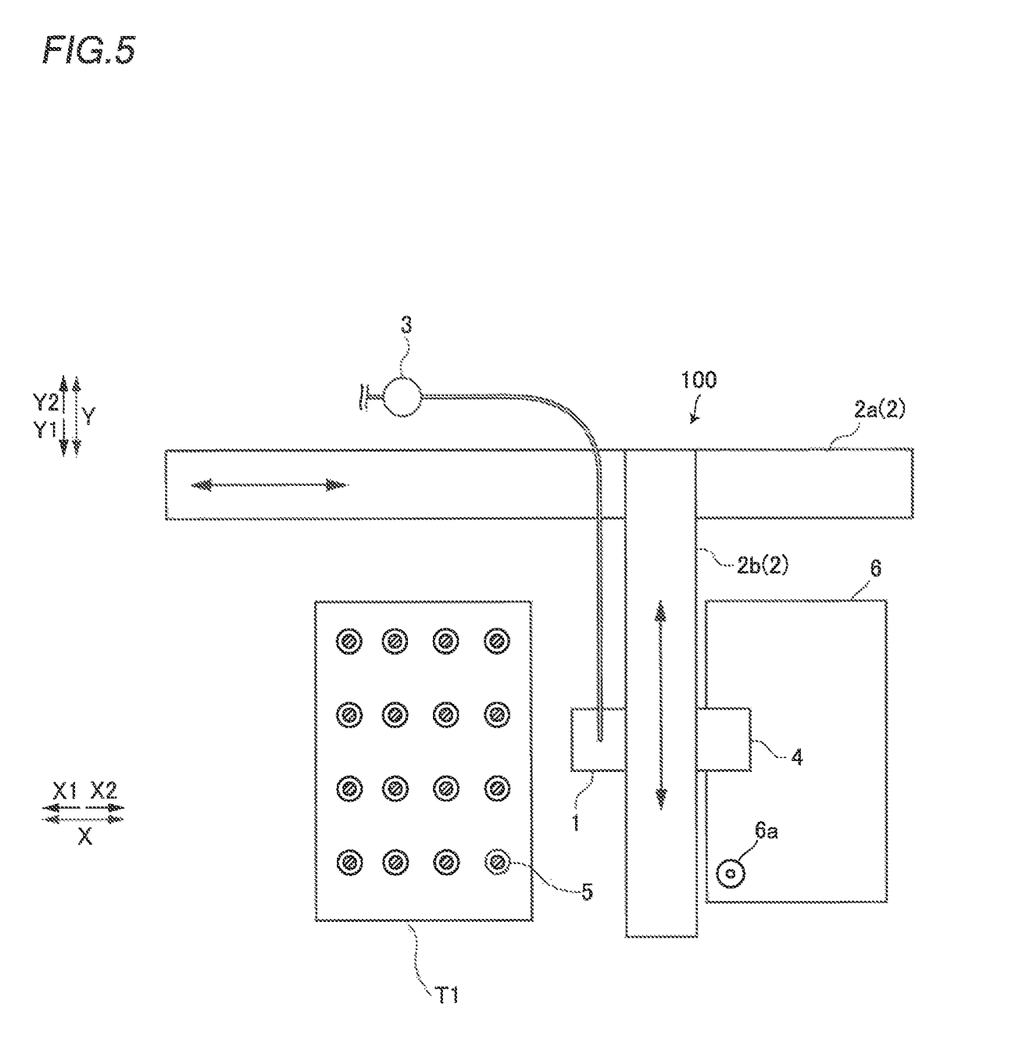
FIG. 5 is a schematic view showing the structure of a horizontal movement mechanism according to the first embodiment.

As shown in FIGS. 4 and 5, the movement mechanism 2 moves the sample container holder 1 and the sample suction and discharge unit 4 integrally in a horizontal plane.

The movement mechanism 2 includes a horizontal plane movement mechanism and a vertical movement mechanism. The horizontal plane movement mechanism includes a first direction movement mechanism 2a that moves the sample container holder 1 and the sample suction and discharge unit 4 in an X direction, and a second direction movement mechanism 2b that moves the sample container holder 1 and the sample suction and discharge unit 4 in a Y direction. The X direction and the Y direction are orthogonal to each other in the horizontal plane. A direction toward the side on which the tray T1 is provided in the X direction is taken as an X1 direction. As shown in FIG. 5, a direction toward the side on which a sample inlet 6a is provided in the X direction is taken as an X2 direction. Moreover, a direction toward the side of the second direction movement mechanism 2b closer to the first direction movement mechanism 2a in the Y direction is taken as a Y2 direction. A direction opposite to the Y2 direction is taken as a Y1 direction.

The first direction movement mechanism 2a moves the second direction movement mechanism 2b in the X direction. Specifically, the first direction movement mechanism 2a holds one end side (Y2 side) of the second direction movement mechanism 2b. The first direction movement mechanism 2a includes a linear motion mechanism such as a ball screw mechanism or a rack and pinion mechanism.

The second direction movement mechanism 2b moves the sample container holder 1 and the sample suction and discharge unit 4 in the Y direction. The sample container holder 1 is provided on the side of the second direction movement mechanism 2b closer to the tray T1 of the sample transfer device 100. In addition, the sample suction and discharge unit 4 is provided on the side of the second direction movement mechanism 2b closer to a chromatographic device 6. In the first embodiment, as shown in FIG. 5, the sample container holder 1 and the sample suction and discharge unit 4 are installed at positions different from each other in the horizontal plane. The second direction movement mechanism 2b includes a linear motion mechanism such as a ball screw mechanism or a rack and pinion mechanism.

In an example shown in FIG. 5, the sample container holder 1 and the sample suction and discharge unit 4 are provided in the first direction movement mechanism 2a via the second direction movement mechanism 2b. Therefore, the sample container holder 1 and the sample suction and discharge unit 4 are moved in the Y direction by the second direction movement mechanism 2b and are moved in the X direction by the first direction movement mechanism 2a. That is, in the first embodiment, the sample container holder 1 and the sample suction and discharge unit 4 are movable in an X-Y plane by the horizontal plane movement mechanism.

The structure of the vertical movement mechanism according to the first embodiment is now described with reference to FIGS. 4 and 6. In the first embodiment, a direction in which the sample container holder 1 and the sample suction and discharge unit 4 are moved by the vertical movement mechanism is taken as a Z direction. As shown in FIG. 4, a direction toward the side on which the chromatographic device 6 is provided in the Z direction is taken as a Z2 direction, and a direction opposite to the Z2 direction is taken as a Z1 direction.

As shown in FIG. 4, the vertical movement mechanism includes a first vertical movement mechanism 2c and a second vertical movement mechanism 2d. The first vertical movement mechanism 2c moves the sample container holder 1 in a vertical direction. The second vertical movement mechanism 2d moves the sample suction and discharge unit 4 in the vertical direction. Therefore, the vertical movement mechanism can move the sample container holder 1 and the sample suction and discharge unit 4 independently of each other in the vertical direction.

As shown in FIG. 4, the first vertical movement mechanism 2c includes a mover 20 and a drive 21. The sample container holder 1 is provided on the first end side of the mover 20, and a rack is provided on the second end side thereof. The first vertical movement mechanism 2c rotates a pinion by the drive 21 so as to move the mover 20 in the vertical direction. The first vertical movement mechanism 2c is a so-called rack and pinion mechanism.

Figure 6:
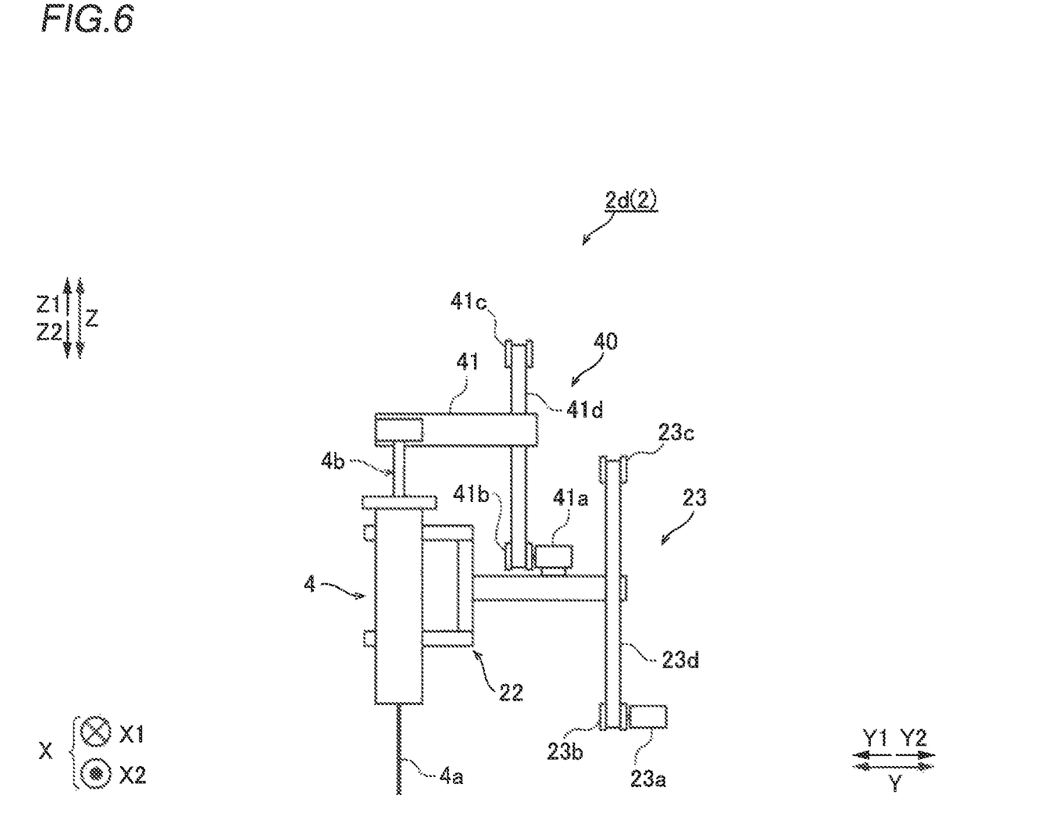
FIG. 6 is a schematic view showing the structure of a vertical movement mechanism according to the first embodiment.

FIG. 6 is a schematic view of the second vertical movement mechanism 2d as viewed in the X direction. As shown in FIG. 6, the second vertical movement mechanism 2d includes a first support 22 that grips the sample suction and discharge unit 4 and a support movement mechanism 23 that moves the first support 22 in the vertical direction.

The support movement mechanism 23 includes a first motor 23a, a first pulley 23b, a second pulley 23c, and a first belt 23d provided on the first pulley 23b and the second pulley 23c. The first support 22 is provided on the first belt 23d, and the first belt 23d is moved due to rotation of the first motor 23a such that the first support 22 is moved in the vertical direction. The support movement mechanism 23 is a so-called belt and pulley mechanism.

The air supply unit 3 includes a compressor that compresses and supplies air, and a flow rate adjuster that adjusts the flow rate. The flow rate adjuster is, for example, a mass flow controller. The air supply unit 3 sends air compressed by the compressor to the jets 1e of the sample container holder 1 via the flow path P. A negative pressure to be generated is determined in advance according to the flow rate of air to be ejected. Therefore, the amount of air to be supplied from the air supply unit 3 to the jets 1e is adjusted by the flow rate adjuster such that the negative pressure to be generated from the sample container holder 1 is adjusted. For example, when the sample container 5 is light, air having a relatively small flow rate can be supplied, and when the sample container 5 is heavy, air having a relatively large flow rate can be supplied.

As shown in FIG. 6, the sample suction and discharge unit 4 includes a needle 4a that suctions and discharges a sample, and a plunger 4b. In addition, the sample suction and discharge unit 4 includes a syringe etc., for example.

The sample suction and discharge unit 4 includes a plunger movement mechanism 40 that causes the sample suction and discharge unit 4 to suction and discharge the sample by moving the plunger 4b up and down. The plunger movement mechanism 40 includes a plunger support 41, a second motor 41a, a third pulley 41b, a fourth pulley 41c, and a second belt 41d provided on the third pulley 41b and the fourth pulley 41c. The plunger support 41 is provided on the second belt 41d, and the second belt 41d is moved due to rotation of the second motor 41a such that the plunger support 41 is moved in the vertical direction. The plunger movement mechanism 40 is a so-called belt and pulley mechanism.

In the first embodiment, the sample suction and discharge unit 4 suctions a sample to be analyzed by the chromatographic device 6 and discharges the sample to a predetermined position of the chromatographic device 6. The predetermined position of the chromatographic device 6 is the sample inlet 6a, as shown in FIG. 5.

Figure 7:
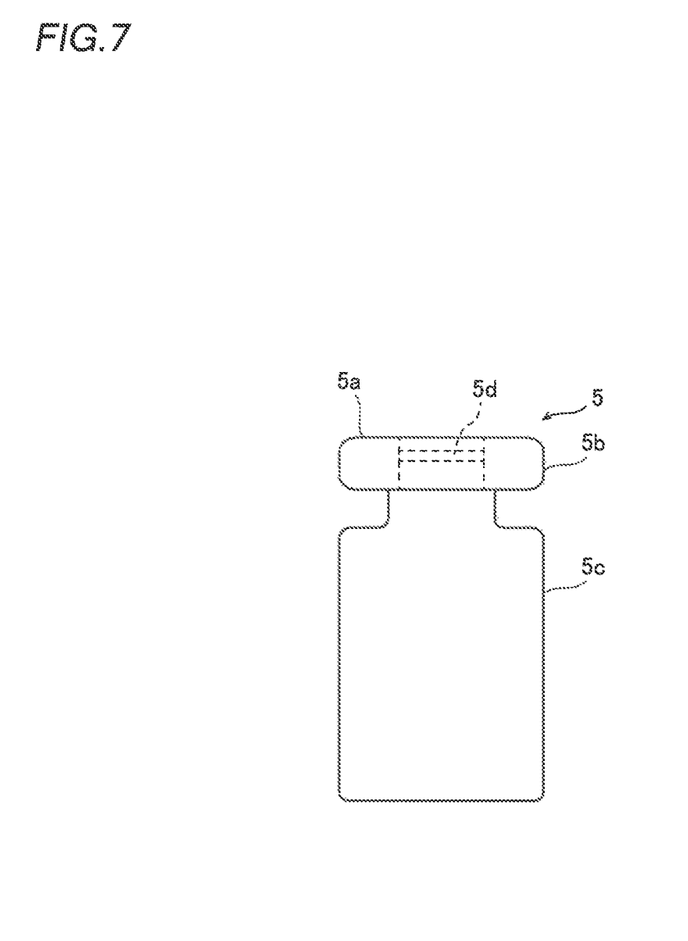
FIG. 7 is a schematic view showing a sample container according to the first embodiment.

As shown in FIG. 7, the sample container 5 includes the lid 5b and a container 5c. The container 5c has a cylindrical shape with a bottom and includes an upper opening. The container 5c is made of glass, for example. The lid 5b has a disk shape that seals the upper opening of the container 5c. The lid 5b is provided to seal the container 5c such that the sample placed in the container 5c does not spill out. The sample container 5 contains the sample to be analyzed.

The lid 5b includes a needle penetration portion 5d into which the needle 4a is inserted when the sample suction and discharge unit 4 suctions the sample. The needle penetration portion 5d is made of a material capable of sealing the inside of the sample container 5 even after the sample is suctioned by the sample suction and discharge unit 4. The needle penetration portion 5d is made of rubber, for example.

Movement of the sample transfer device 100 according to the first embodiment is now described.

First, a user adjusts the flow rate of the air ejected from the jets 1e based on the size and weight of the sample container 5 to be transferred. The flow rate of the air to be supplied and the amount of negative pressure to be generated are determined in advance by the sample transfer device 100. Therefore, the user adjusts the flow rate adjuster so as to generate the negative pressure necessary to hold the sample container 5, and supplies air having a necessary flow rate from the compressor to the jets 1e.

The user moves the sample container holder 1 from a position shown in FIG. 4 to a position that faces the upper surface 5a of the sample container 5 with the horizontal plane movement mechanism. Then, the user brings the sample container holder 1 close to the upper surface 5a of the sample container 5 with the vertical movement mechanism.

After causing the sample container holder 1 to hold the sample container 5, the user pulls up the sample container holder 1 with the vertical movement mechanism so as not to touch another sample container 5. Then, the sample container holder 1 is moved to the position of the holding hole of the turret T2 by the horizontal plane movement mechanism.

After moving the sample container 5 to the position of the holding hole of the turret T2 with the horizontal plane movement mechanism, the user further vertically moves the sample container holder 1 so as to bring the sample container 5 close to the holding hole with the vertical movement mechanism. The sample container 5 is inserted into the holding hole of the turret T2. The user stops air supply from the air supply unit 3 to the jets 1e such that the negative pressure between the jets 1e and the upper surface 5a of the sample container 5 disappears, and holding of the sample container 5 is released. Thus, the sample container 5 is placed on the turret T2.

The user moves the sample suction and discharge unit 4 to the upper surface 5a of the sample container 5 with a horizontal movement mechanism, similarly to the sample container holder 1. Then, the user inserts the needle 4a into the lid 5b of the sample container 5 with the vertical movement mechanism. The plunger 4b is pulled up in the Z1 direction by the second vertical movement mechanism 2d such that the sample in the sample container 5 is suctioned.

The user pulls out the needle 4a from the lid 5b of the sample container 5 with the vertical movement mechanism. Then, the user moves the sample suction and discharge unit 4 to the sample inlet 6a of the chromatographic device 6 with the horizontal movement mechanism. Furthermore, the user inserts the needle 4a into the sample inlet 6a with the vertical movement mechanism. Then, the user pushes the plunger 4b downward with the second vertical movement mechanism 2d to discharge the sample.

Advantageous Effects of First Embodiment

According to the first embodiment, the following advantageous effects are achieved.

According to the first embodiment, as described above, the sample transfer device 100 includes the sample container holder 1 including at least one jet 1e that ejects air, and the sample container holder 1 holds the upper surface 5a of the sample container 5 in a non-contact state by the negative pressure generated due to the horizontally outward flow of the air ejected from the jet 1e. Accordingly, the sample container holder 1 can hold the sample container 5 in a non-contact state by the negative pressure generated due to the flow of the air ejected from the jet 1e. Consequently, it is not necessary to provide a gripper that grips the sample container 5, and thus it is not necessary to provide a large gap between the sample containers 5. In addition, the upper surface 5a of the sample container 5 is held in a non-contact state such that a special lid 5b made of metal, for example, is not necessary. Therefore, it is not necessary to replace the lid 5b of the sample container 5. Furthermore, the sample container 5 can be held in a non-contact state, and thus the occurrence of contamination can be significantly reduced or prevented. In addition, the sample container 5, the contact of which is to be avoided because a drug or a high-temperature sample is contained therein, can be safely transferred.

According to the first embodiment, as described above, the sample container holder 1 includes the inner side face portion 1d that restricts the horizontal movement of the held sample container 5. Accordingly, the sample container holder 1 can significantly reduce or prevent the horizontal movement of the sample container 5 while holding the sample container 5 in a non-contact state. Consequently, the sample container 5 can be held without displacement, and thus the sample container holder 1 can accurately transfer the sample container 5 to a target location even in a non-contact state with the sample container 5.

According to the first embodiment, as described above, the sample container holder 1 includes the recess 1b, and the recess 1b includes the bottom face portion 1c that holds the sample container 5 in a non-contact state and the inner side face portion 1d that serves as the position restrictor. Accordingly, when the sample container 5 held by the bottom face portion 1c horizontally moves, the sample container 5 comes into contact with the inner side face portion 1d of the recess 1b such that further movement of the sample container 5 is prevented. Consequently, large horizontal movement of the sample container 5 can be reliably significantly reduced or prevented, and thus the sample container holder 1 can reliably transfer the sample container 5 to a target location even in a non-contact state with the sample container 5.

According to the first embodiment, as described above, the sample transfer device 100 further includes the sample suction and discharge unit 4 that suctions the sample from the sample container 5 and discharges the sample at a predetermined position, and the movement mechanism 2 integrally moves the sample container holder 1 and the sample suction and discharge unit 4 in the horizontal plane. Accordingly, the sample container holder 1 and the sample suction and discharge unit 4 can be integral and unitary with each other. In addition, the sample container holder 1 and the sample suction and discharge unit 4 integrally move such that it is not necessary to individually provide the drive 21 for each of the sample container holder 1 and the sample suction and discharge unit 4. Consequently, it is not necessary to provide a sample suction and discharge device separately from the sample transfer device 100 while it is possible to perform suction from the sample container 5 and discharge. Thus, the structure of the device can be simplified, and an increase in the size of the device can be significantly reduced or prevented.

According to the first embodiment, as described above, the sample suction and discharge unit 4 suctions the sample to be analyzed by the chromatographic device 6 and discharges the sample to the predetermined position of the chromatographic device 6. Accordingly, in one sample transfer device 100, the sample container 5 can be transferred, and the sample can be suctioned and discharged to the predetermined position of the chromatographic device 6. Thus, the sample can be suctioned from the sample container 5 transferred in a non-contact state and can be discharged to the chromatographic device 6. Consequently, the occurrence of contamination can be significantly reduced or prevented, and thus accurate chromatographic results can be obtained.

According to the first embodiment, as described above, the plurality of jets 1e are provided at the equal intervals in a portion that holds the upper surface 5a of the sample container 5 in the sample container holder 1. Accordingly, air is ejected at a constant interval, and thus the occurrence of unevenness in the air flow due to concentration of the jets 1e in one area can be significantly reduced or prevented. Consequently, uniform air flow is obtained at all places in the portion that holds the sample container 5 in the sample container holder 1. Consequently, the sample container holder 1 can stably hold the sample container 5.

Second Embodiment

The structure of a sample transfer device 200 according to a second embodiment of the present invention is now described with reference to FIGS. 8 to 10.

In the sample transfer device 200 according to the second embodiment, a sample container holder 1 is provided at the tip of a second direction movement mechanism 2b, unlike the first embodiment. The same structures of the sample transfer device 200 as those of the first embodiment are denoted by the same reference numerals, and description thereof is omitted.

Figure 8:
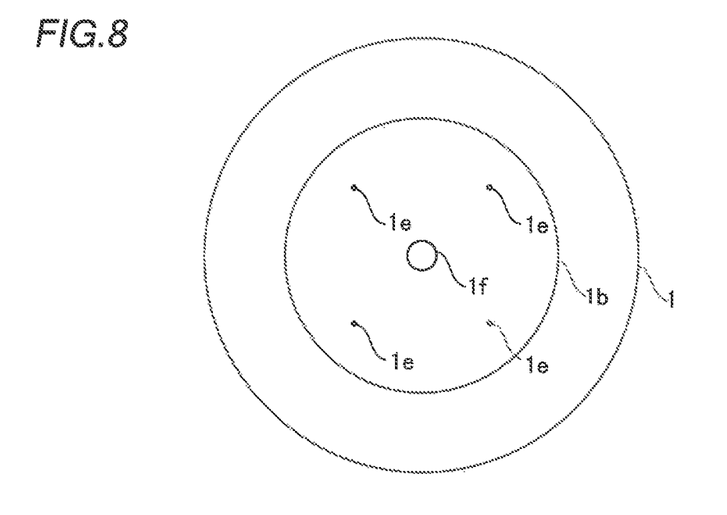
FIG. 8 is a bottom view of a sample container holder according to a second embodiment.
Figure 9:
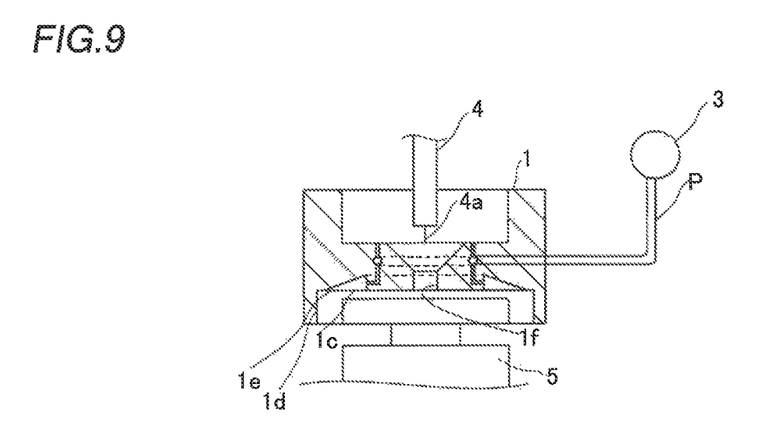
FIG. 9 is a sectional view of the sample container holder according to the second embodiment.

As shown in FIGS. 8 and 9, in the center of the bottom face portion 1c of the sample container holder 1, a through-hole 1f through which a sample suction and discharge unit 4 is moved relative to the sample container holder 1 vertically downward is provided. A plurality of jets 1e surround the through-hole 1f. The jets 1e and the through-hole 1f are provided independently of each other.

The jets 1e each include a depression such that air is ejected obliquely. The depression is sloped so as to become thinner toward the outer circumferential side, and thus the air is ejected in an oblique direction along the slope.

Figure 10:
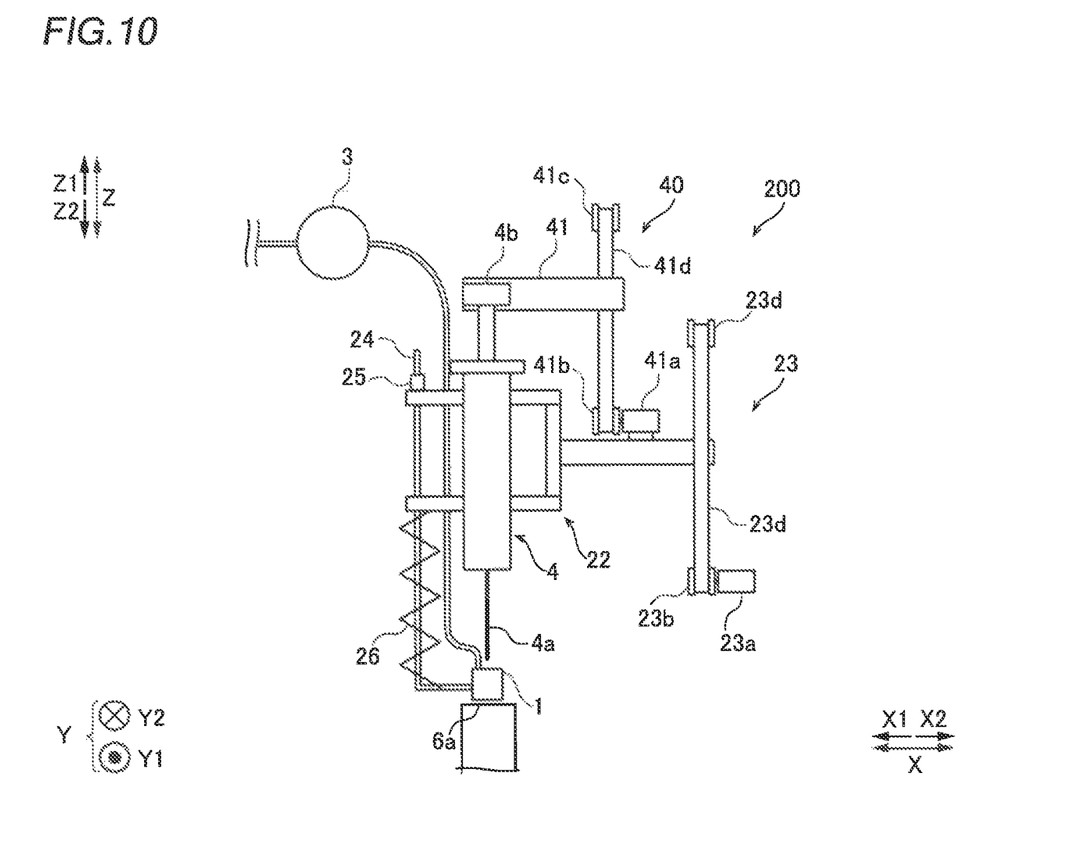
FIG. 10 is a schematic view showing the structure of a movement mechanism according to the second embodiment.

As shown in FIG. 10, the sample transfer device 200 includes a vertical movement mechanism similar to the second vertical movement mechanism 2d according to the first embodiment. The vertical movement mechanism integrally moves the sample container holder 1 and the sample suction and discharge unit 4. A first support 22 grips the sample container holder 1 and the sample suction and discharge unit 4. Specifically, the first support 22 grips a second support 24 provided with the sample container holder 1. The second support 24 includes a stopper 25 and a spring 26. When the sample suction and discharge unit 4 discharges the sample to a chromatographic device 6, the sample suction and discharge unit 4 is moved toward the sample container holder 1 by the stopper 25 and the spring 26 such that a needle 4a of the sample suction and discharge unit 4 passes through the through-hole 1f of the sample container holder 1.

In the second embodiment, unlike the first embodiment, it is not necessary for a user to horizontally move the sample suction and discharge unit 4 after moving a sample container 5 to a turret T2 with the sample container holder 1.

The remaining structures of the second embodiment are similar to those of the aforementioned first embodiment.

Advantageous Effects of Second Embodiment

According to the second embodiment, the following advantageous effects are achieved.

According to the second embodiment, as described above, in the sample transfer device 200, the sample container holder 1 and the sample suction and discharge unit 4 are provided coaxially, and the sample container holder 1 is provided at the vertically downward tip of the sample suction and discharge unit 4. Accordingly, immediately after the sample container 5 is transferred by the sample container holder 1 in one sample transfer device 200, the sample suction and discharge unit 4 can suction a sample.

According to the second embodiment, as described above, the through-hole 1f through which the sample suction and discharge unit 4 is moved relative to the sample container holder 1 vertically downward is provided in the center of a portion that holds the sample container 5 in the sample container holder 1, and the plurality of jets 1e surround the through-hole 1f. Accordingly, the jets 1e are provided around the through-hole 1f such that the pressure balance of the air ejected from the jets 1e can be kept uniform. Furthermore, the through-hole 1f is provided separately from the jets 1e such that the sample suction and discharge unit 4 can be moved vertically downward immediately after the sample container 5 is transferred, and can easily suction the sample.

The remaining advantageous effects of the second embodiment are similar to those of the aforementioned first embodiment.

Third Embodiment

The structure of a sample transfer device 300 according to a third embodiment of the present invention is now described with reference to FIGS. 11 to 14.

Figure 11:
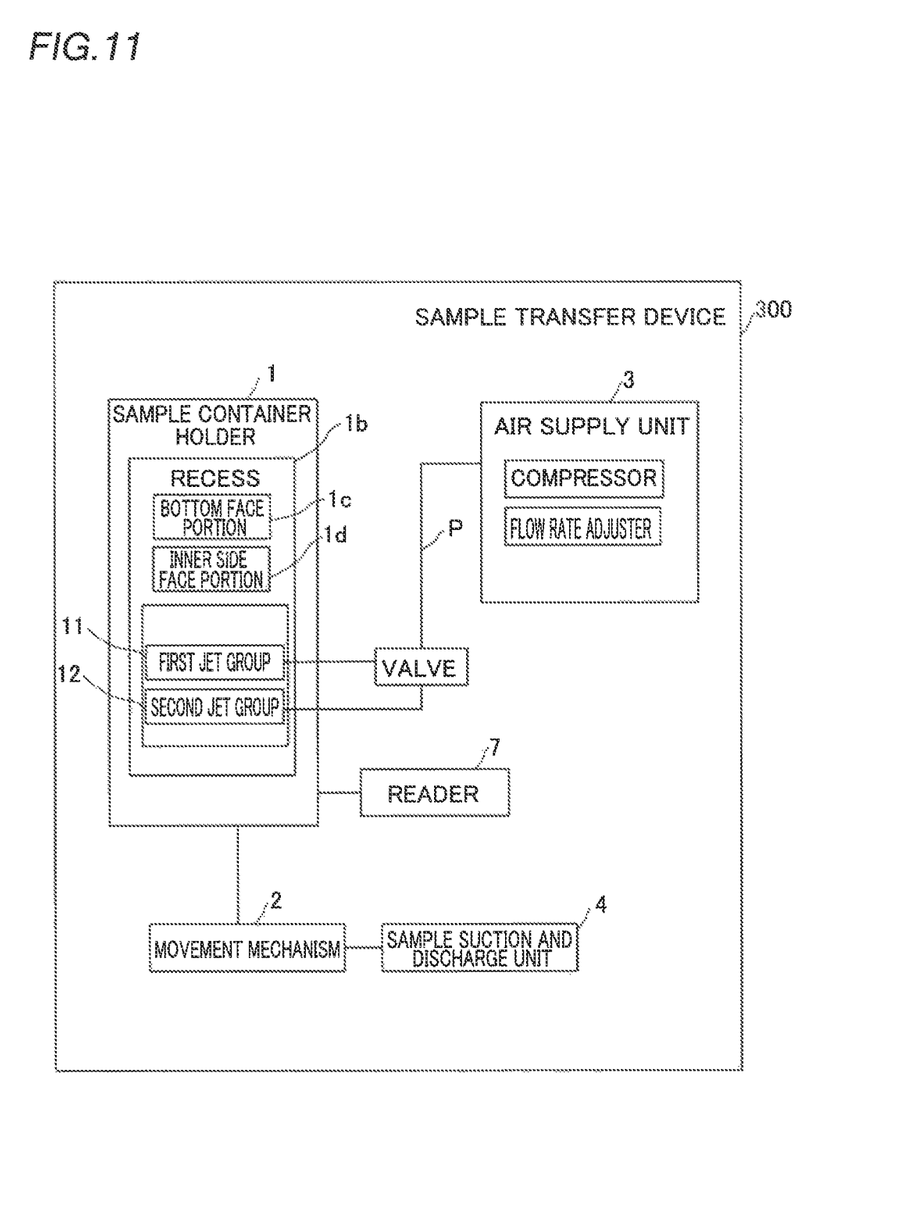
FIG. 11 is a block diagram showing the overall structure of a sample transfer device according to a third embodiment.

As shown in FIG. 11, in the third embodiment, the sample transfer device 300 includes a reader 7, a first jet group 11, and a second jet group 12 in addition to the structures of the sample transfer devices 100 and 200 according to the aforementioned first and second embodiments.

Figure 12:
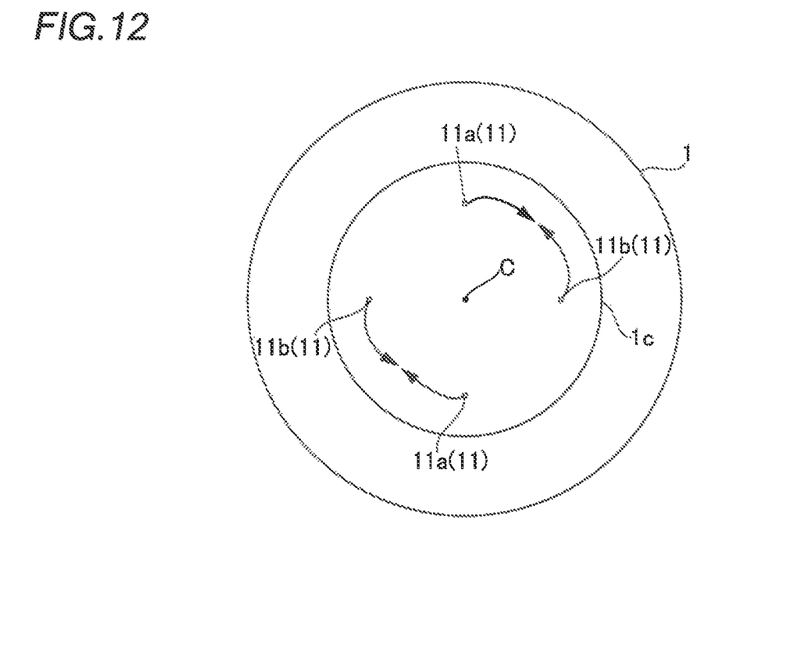
FIG. 12 is a schematic view showing a first jet group according to the third embodiment.

As shown in FIG. 12, the first jet group 11 includes a plurality of jets 11a and a plurality of jets 11b provided point-symmetrically with respect to the center C of the bottom face portion 1c of a sample container holder 1. Air ejected from the plurality of jets 11a and air ejected from the plurality of jets 11b collide with each other. The jets 11a that eject air clockwise about the center C of the bottom face portion 1c of the sample container holder 1 and the jets 11b that eject air counterclockwise about the center C of the bottom face portion 1c of the sample container holder 1 are alternately installed such that the air ejected from the jets 11a and the air ejected from the jets 11b collide with each other, and the forces cancel each other out such that a sample container 5 can be held without being rotated.

Figure 13:
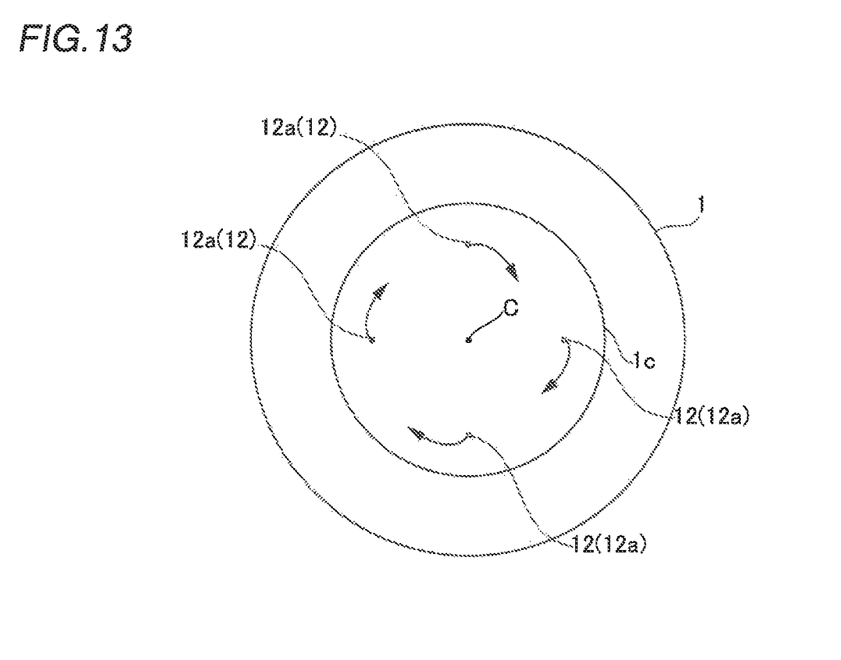
FIG. 13 is a schematic view showing a second jet group according to the third embodiment.

As shown in FIG. 13, the second jet group 12 includes a plurality of jets 12a provided point-symmetrically with respect to the center C of the bottom face portion 1c of the sample container holder 1. Directions in which air is ejected from the plurality of jets 12a are aligned such that a rotating air flow is generated. When the air ejected from the jets 12a is clockwise about the center C of the bottom face portion 1c of the sample container holder 1, a clockwise rotating air flow is generated around the sample container 5 to rotate the sample container 5.

A valve for path switching is provided in one air supply unit 3, and a flow path P connected to the first jet group 11 or the second jet group 12 is switched such that the first jet group 11 and the second jet group 12 are switchable. Consequently, the sample container holder 1 can hold the sample container 5 with or without rotating the sample container 5.

Figure 14:
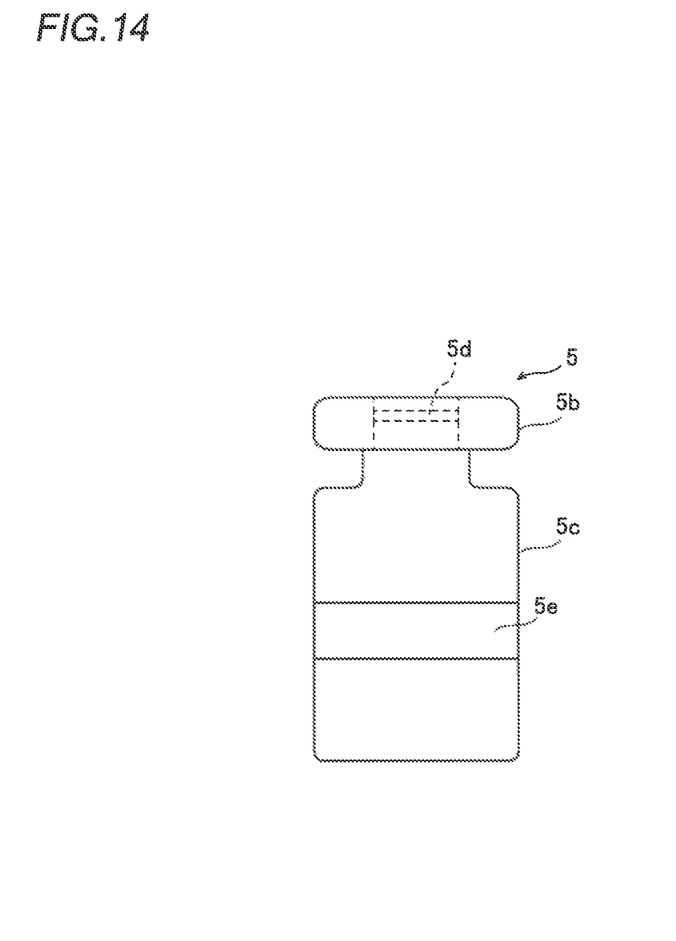
FIG. 14 is a schematic view showing a sample container according to the third embodiment.

As shown in FIG. 14, an identification information label 5e is attached to a side surface of the sample container 5. Identification information is a sample number, the composition of a sample, etc. The label is a bar code. The reader 7 is a bar code reader. The reader 7 is provided integrally with the sample transfer device 300 (see FIG. 11).

The sample container holder 1 transfers the sample container 5 to a reading position of the reader 7. The reader 7 reads the identification information from the sample container 5 held while being rotated by the sample container holder 1. The read identification information may be stored in a storage (not shown) in association with the chromatographic results.

The remaining structures of the third embodiment are similar to those of the aforementioned first and second embodiments.

Advantageous Effects of Third Embodiment

According to the third embodiment, the following advantageous effects are achieved.

According to the third embodiment, the plurality of jets 11a and the plurality of jets 11b are provided point-symmetrically with respect to the center of the portion that holds the sample container 5 in the sample container holder 1, and the air ejected from the jets 11a and the jets 11b collides with each other to flow horizontally outward. Accordingly, the ejected air collides with each other such that the sample container holder 1 can hold the sample container 5 without rotating the sample container 5. Therefore, the sample container 5 can be transferred without changing its orientation.

According to the third embodiment, the plurality of jets 12a are provided point-symmetrically with respect to the center of the portion that holds the sample container 5 in the sample container holder 1, and the air ejected from the plurality of jets 12a forms a rotating air flow. Accordingly, the sample container 5 can be rotated by the rotating air flow, and thus the label or the like attached to the sample container 5 can be read by the reader 7 fixedly installed.

According to the third embodiment, the sample transfer device 300 includes the reader 7 that reads the identification information label 5e attached to the side surface of the sample container 5, and the sample container holder 1 holds the sample container 5 while rotating the sample container 5 at the reading position so as to enable the reader 7 to read the identification information label 5e attached to the side surface of the sample container 5. Accordingly, it is not necessary to rotate the reader 7 in order to enable the reader 7 to read the identification information label 5e attached to the sample container 5. Furthermore, the sample container 5 is rotated by the air flow such that it is not necessary to provide a drive source that rotates the sample container 5. Consequently, the structure of the sample transfer device 300 can be simplified.

According to the third embodiment, the sample container holder 1 includes the first jet group 11 including the plurality of jets 11a and the plurality of jets 11b that eject the air such that the air collides with each other to flow horizontally outward, and the second jet group 12 including the plurality of jets 12a that eject the air such that the air flows horizontally outward while forming a rotating air flow, and the sample container holder 1 switches the supply destination of the air from the air supply unit 3 to the first jet group 11 or the second jet group 12. Accordingly, the supply destination of the air from the air supply unit 3 is switched such that it is possible to switch whether the sample container 5 is rotated and held or is held without being rotated. Consequently, after the sample container 5 is transferred, the identification information label 5e can be read by rotating the sample container 5.

The remaining advantageous effects of the third embodiment are similar to those of the aforementioned first and second embodiments.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the sample container holder includes the recess in each of the aforementioned first to third embodiments, the present invention is not restricted to this. For example, the sample container holder may alternatively include a pin or a wall for position restriction around the sample container holder instead of the recess, and the pin or the wall for position restriction may alternatively be a position restrictor.

While the jets are provided obliquely to the recess in each of the aforementioned first to third embodiments, the present invention is not restricted to this. For example, the jets may alternatively be provided sideways.

While the sample container holder holds the sample container that includes the lid including the needle penetration portion in each of the aforementioned first to third embodiments, the present invention is not restricted to this. For example, the sample container holder may alternatively hold the sample container that includes a lid not including the needle penetration portion. Furthermore, the sample container holder may alternatively hold an analysis tool such as a test tube, a plastic tube, a well plate, or a petri dish in addition to the sample container.

While the sample container is transferred by the sample container holder in each of the aforementioned first to third embodiments, the present invention is not restricted to this. For example, a solid sample itself may alternatively be held and transferred.

While one horizontal movement mechanism is provided in each of the aforementioned first to third embodiments, the present invention is not restricted to this. For example, two horizontal movement mechanisms may alternatively be provided.

While the plurality of jets are provided at the equal intervals in the portion that holds the upper surface of the sample container in the sample container holder in each of the aforementioned first to third embodiments, the present invention is not restricted to this. For example, the intervals between the jets may alternatively be varied.

While the sample suction and discharge unit discharges the sample to the chromatographic device in each of the aforementioned first to third embodiments, the present invention is not restricted to this. The device to which the sample suction and discharge unit discharges the sample is not restricted to the chromatographic device. For example, the sample suction and discharge unit may alternatively discharge the sample to an analyzer such as a mass spectrometer or a spectrometric analyzer. Furthermore, the sample suction and discharge unit may alternatively discharge the sample into a test tube, a plastic tube, or the like in order to adjust the sample to be analyzed.

While the vertical movement mechanism (first vertical movement mechanism) moves the sample container holder in the vertical direction with the rack and pinion mechanism in the aforementioned first embodiment, the present invention is not restricted to this. The vertical movement mechanism (first vertical movement mechanism) may alternatively be configured in any manner as long as the same can move the sample container holder in the vertical direction. The vertical movement mechanism (first vertical movement mechanism) may alternatively include a ball screw mechanism or a belt and pulley mechanism, for example.

While the vertical movement mechanism (second vertical movement mechanism) moves the sample suction and discharge unit in the vertical direction with the belt and pulley mechanism in the aforementioned first embodiment, the present invention is not restricted to this. The vertical movement mechanism (second vertical movement mechanism) may alternatively be configured in any manner as long as the same can move the sample suction and discharge unit in the vertical direction. The vertical movement mechanism (second vertical movement mechanism) may alternatively include a ball screw mechanism or a rack and pinion mechanism, for example.

While the vertical movement mechanism moves the sample suction and discharge unit in the vertical direction with the belt and pulley mechanism in the aforementioned second embodiment, the present invention is not restricted to this. The vertical movement mechanism may alternatively be configured in any manner as long as the same can move the sample suction and discharge unit in the vertical direction. The vertical movement mechanism may alternatively include a ball screw mechanism or a rack and pinion mechanism, for example.

While the label is a barcode in the aforementioned third embodiment, the present invention is not restricted to this. For example, the label may alternatively be a QR code (registered trademark). In addition, the reader is changed as appropriate according to the label.

While the reader and the sample transfer device are integral and unitary with each other in the aforementioned third embodiment, the present invention is not restricted to this. For example, the reader and the sample transfer device may alternatively be separate from each other.

While the first jet group and the second jet group are provided in the aforementioned third embodiment, the present invention is not restricted to this. For example, only the first jet group may alternatively be provided.

While the first jet group and the second jet group are provided in the aforementioned third embodiment, the present invention is not restricted to this. For example, only the second jet group may alternatively be provided.

What is claimed is:

1. A sample transfer device comprising:
    a sample container holder including at least one jet that ejects air;
    a mover that moves the sample container holder;
    an air supplier that supplies the air to the sample container holder; and
    a sample dispenser that suctions a sample from a sample container and dispenses the sample at a predetermined position, wherein the mover integrally moves the sample container holder and the sample dispenser in a horizontal plane; wherein
    the jet is provided in a portion that holds a lid of the sample container in the sample container holder, and directs the air supplied from the air supplier from an upper side of the sample container toward the outside of the sample container horizontally; and
    the sample container holder holds an upper surface of the lid of the sample container in a non-contact state by a negative pressure generated due to flow of the air ejected from the jet from the upper side of the sample container toward the outside of the sample container horizontally.

2. The sample transfer device according to claim 1, wherein the sample container holder includes a position restricting wall that restricts horizontal movement of the sample container held by the sample container holder.

3. The sample transfer device according to claim 2, wherein the sample container holder includes a recess; and the recess includes a bottom face portion that holds the sample container in the non-contact state and an inner side face portion that serves as the position restricting wall.

4. The sample transfer device according to claim 1, wherein the sample dispenser suctions the sample to be analyzed by a chromatographic device and dispenses the sample to a predetermined position of the chromatographic device.

5. The sample transfer device according to claim 1, wherein the sample container holder and the sample dispenser are provided coaxially; and
    the sample container holder is provided at a vertically downward tip of the sample dispenser.

6. The sample transfer device according to claim 5, wherein the sample container holder includes, in a center of a portion that holds the sample container, a through-hole through which the sample dispenser is moved relative to the sample container holder vertically downward; and
    the jet includes a plurality of jets that surround the through-hole.

7. The sample transfer device according to claim 1, wherein the jet includes a plurality of jets provided at equal intervals in a portion that holds the upper surface of the sample container in the sample container holder.

8. The sample transfer device according to claim 1, wherein the jet includes a plurality of jets provided point-symmetrically with respect to a center of the portion that holds the sample container in the sample container holder; and
    the air ejected from the plurality of jets collides with each other to flow horizontally outward.

9. The sample transfer device according to claim 1, wherein the jet includes a plurality of jets provided point-symmetrically with respect to a center of the portion that holds the sample container in the sample container holder; and
    the air ejected from the plurality of jets forms a rotating air flow.

10. The sample transfer device according to claim 9, further comprising a reader that reads an identification information label attached to a side surface of the sample container;
    wherein the sample container holder holds the sample container while rotating the sample container at a reading position so as to enable the reader to read the identification information label attached to the side surface of the sample container.

11. The sample transfer device according to claim 1, wherein the sample container holder includes a first jet group including a plurality of jets that eject the air such that the air collides with each other to flow horizontally outward, and a second jet group including a plurality of jets that eject the air such that the air flows horizontally outward while forming a rotating air flow; and
    the sample container holder switches a supply destination of the air from the air supplier to the first jet group or the second jet group.

* * * * *